United States Patent
Sesser et al.

(10) Patent No.: US 9,010,660 B2
(45) Date of Patent: Apr. 21, 2015

(54) INTEGRATED SPRINKLER HEAD MULTI-NOZZLE/SHUT-OFF SYSTEM

(75) Inventors: George L. Sesser, Walla, WA (US); Barton R. Nelson, Walla, WA (US)

(73) Assignee: Nelson Irrigation Corporation, Walla Walla, WA (US)

(*) Notice: Subject to any disclaimer, the term of this patent is extended or adjusted under 35 U.S.C. 154(b) by 443 days.

(21) Appl. No.: 13/490,534

(22) Filed: Jun. 7, 2012

(65) Prior Publication Data

US 2012/0312898 A1 Dec. 13, 2012

Related U.S. Application Data (60) Provisional application No. 61/496,277, filed on Jun. 13, 2011.

(51) Int. Cl.
| | |
|---|---|
| *B05B 3/00* | (2006.01) |
| *A01G 25/16* | (2006.01) |
| *B05B 1/16* | (2006.01) |
| *B05B 1/26* | (2006.01) |

(52) U.S. Cl.
CPC ............. *A01G 25/16* (2013.01); *B05B 1/1645* (2013.01); *B05B 1/169* (2013.01); *B05B 1/26* (2013.01)

(58) Field of Classification Search
USPC ............. 239/390–395, 203–206, 225.1, 237, 239/240, 246–249, 104, 106, 114, 115, 123
See application file for complete search history.

(56) References Cited

U.S. PATENT DOCUMENTS

| | | |
|---|---|---|
| 2,060,943 A | 11/1936 | Lieb |
| 2,918,200 A | 12/1959 | Libit |
| 3,637,142 A | 1/1972 | Gassaway |
| 3,863,841 A | 2/1975 | Berthoud |
| 4,058,260 A | 11/1977 | Lestradet |
| 4,801,089 A | 1/1989 | Zeman |
| 4,905,903 A | 3/1990 | Katzer et al. |
| 5,125,578 A | 6/1992 | Ballu |
| 5,234,169 A | 8/1993 | McKenzie |
| 5,253,807 A | 10/1993 | Newbegin |
| 5,335,859 A | 8/1994 | Thayer et al. |
| 5,415,348 A | 5/1995 | Nelson |
| 5,456,411 A | 10/1995 | Scott et al. |
| 5,699,962 A | 12/1997 | Scott et al. |
| 5,746,374 A | 5/1998 | Simonetti et al. |
| 5,762,269 A | 6/1998 | Sweet |
| 5,884,847 A | 3/1999 | Christopher |
| 6,085,995 A | 7/2000 | Kah, Jr. et al. |
| 6,182,909 B1 | 2/2001 | Kah, Jr. et al. |
| 6,398,128 B1 | 6/2002 | Hamilton et al. |
| 6,669,120 B2 | 12/2003 | Vernia |

(Continued)

OTHER PUBLICATIONS

U.S. Appl. No. 13/556,324, filed Jul. 24, 2012 (pending).

(Continued)

*Primary Examiner* — Steven J Ganey
(74) *Attorney, Agent, or Firm* — Nixon & Vanderhye P.C.

(57) ABSTRACT

A sprinkler head with plural selectable nozzles includes a sprinkler body having inlet and outlet bores aligned along a first axis; a nozzle magazine rotatably supported on the sprinkler body, the nozzle magazine carrying at least two nozzles and provided with at least one shut-off surface portion located between the at least two nozzles. The nozzles are selectively rotatable into an operative position between the inlet and outlet bores, the nozzle magazine being rotatable about a second axis angularly offset from the first axis.

19 Claims, 8 Drawing Sheets

(56) References Cited

U.S. PATENT DOCUMENTS

| | | |
|---|---|---|
| 6,676,038 B2 | 1/2004 | Gressett, Jr. et al. |
| 6,749,134 B2 | 6/2004 | Arenson et al. |
| 6,772,964 B2 | 8/2004 | Funseth et al. |
| 6,871,795 B2 | 3/2005 | Anuskiewicz |
| 7,980,490 B2 | 7/2011 | Waddelow et al. |
| 7,992,802 B2 * | 8/2011 | Wang .................... 239/392 |
| 2002/0190140 A1 | 12/2002 | Arenson et al. |
| 2009/0321543 A1 | 12/2009 | Lawyer et al. |
| 2010/0102149 A1 | 4/2010 | Lawyer et al. |

OTHER PUBLICATIONS

U.S. Appl. No. 13/626,472, filed Sep. 25, 2012 (pending).
U.S. Appl. No. 13/776,051, filed Feb. 25, 2013 (pending).

* cited by examiner

INTEGRATED SPRINKLER HEAD MULTI-NOZZLE/SHUT-OFF SYSTEM

This application claims priority to U.S. Provisional Application No. 61/496,277 filed Jun. 13, 2011, the entire contents of which are hereby incorporated by reference.

BACKGROUND

This invention relates to irrigation sprinklers and, more specifically, to a sprinkler that incorporates a nozzle magazine configured to selectively rotate different size nozzles into place or, alternatively, rotate a blank surface over the flow path to shut the sprinkler off.

Most sprinklers used in the agricultural industry are fitted with a nozzle having a specified orifice size (or diameter). It is often desirable to change the nozzle flow rate based on particular crops, localized terrain characteristics, and so on. This typically requires removal of one nozzle and replacement by another. This is a time-consuming process, however, involving many individual sprinkler heads mounted, for example, on one or more large irrigator truss spans. The changeover process may also involve shutting off the water supply. On the other hand, leaving the water supply on and providing individual on/off valves for each sprinkler is both expensive and impractical. While multi-nozzle magazines have been developed, they have not been completely satisfactory.

At the same time there are instances where desired sprinkling patterns may dictate that certain sprinklers along a truss span or other sprinkler support be periodically shut off.

It would therefore be desirable to have a simple multiple-nozzle magazine attached to each sprinkler that in the changeover process, automatically shuts off the water supply and automatically restores the supply upon locating the new nozzle in its operational position, or that enables the sprinkler to be shut off and turned back on in a simple reliable manner.

BRIEF SUMMARY OF THE INVENTION

In a first exemplary but nonlimiting embodiment, the invention provides a sprinkler head with plural selectable nozzles comprising a sprinkler body having inlet and outlet bores aligned along a first axis; and a nozzle magazine rotatably supported on the sprinkler body, the nozzle magazine carrying at least two nozzles and provided with at least one shut-off surface portion located between the at least two nozzles, the at least two nozzles and the at least one shut-off surface selectively rotatable into position between the inlet and outlet bores, the nozzle magazine rotatable about a second axis offset from and angled relative to the first axis.

In another exemplary but nonlimiting embodiment, there is provided a sprinkler body adapted for connection between a water supply conduit and a rotatable deflector plate, the sprinkler body comprising vertically-spaced upper and lower supports connected by at least one strut, the upper support including an adapter for connection to the water supply conduit, the lower support formed with a coupling portion for attachment to the rotatable deflector plate; the upper and lower supports formed with aligned first and second bores lying on a longitudinal center axis of the sprinkler body; and a rotatable nozzle magazine mounted between the upper and lower supports and carrying at least two nozzles for selective rotation about an axis oriented at an acute angle to the longitudinal center axis into an operative position where one of the at least two nozzles is aligned with the first and second bores, and wherein at least one shut-off surface portion is located on the magazine between the at least two nozzles.

In still another exemplary but nonlimiting aspect, there is provided a sprinkler head with plural selectable nozzles comprising a sprinkler body having inlet and outlet bores aligned along a first axis; and a nozzle magazine rotatably supported on the sprinkler body, the nozzle magazine provided with three nozzle holders adapted to carry three nozzles and provided with at least two shut-off surface portions located between the three nozzle holders, the nozzle magazine selectively rotatable into any of at least five positions between the inlet and outlet bores, the nozzle magazine rotatable about a second axis angularly offset from the first axis; and wherein the nozzle magazine is provided with an annular peripheral skirt with slots formed adjacent each of the three nozzles and the at least two shut-off surface portions; the sprinkler body formed with a resilient tab engageable within a selected one of the slots.

The invention will be described in detail in connection with the drawings identified below.

DETAILED DESCRIPTION OF THE DRAWINGS

Figure 1:
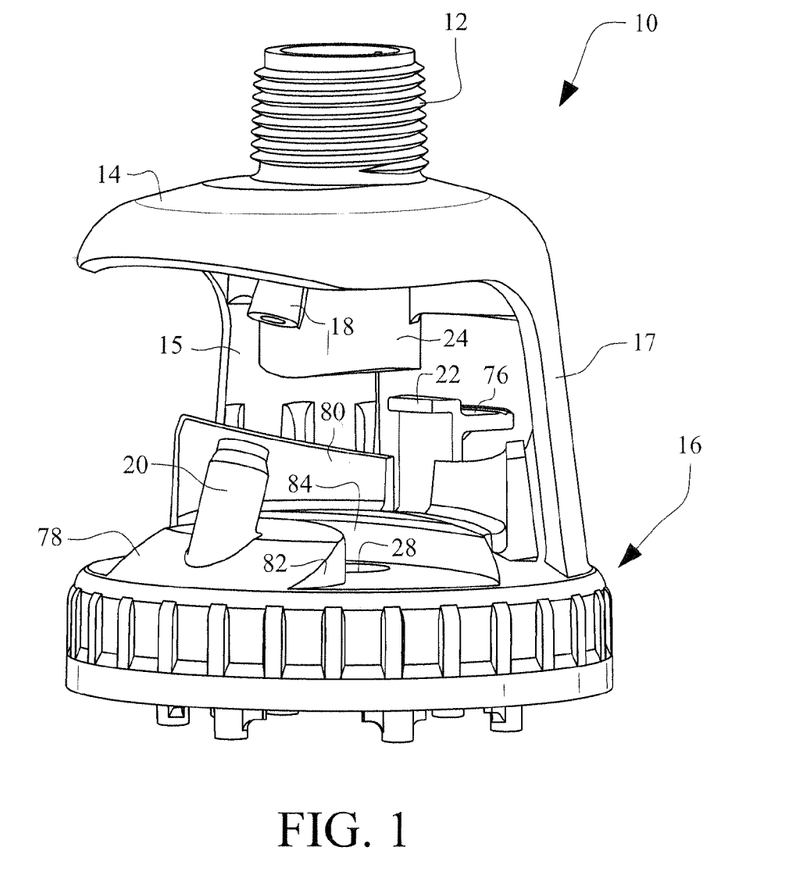
FIG. 1 is a perspective view of a sprinkler head in accordance with an exemplary but nonlimiting embodiment of the invention.

With reference initially to FIG. 1, a sprinkler head or body 10 is formed with an adapter 12 that permits the sprinkler head to be connected to a source of water under pressure or other irrigation component, e.g., a pressure regulator. The sprinkler head 10 is formed as an open frame including an upper support 14 and a lower support 16, with a pair of webs or struts 15, 17 extending therebetween. Between the upper and lower supports, there is an area that receives a rotatable nozzle magazine that permits different sized nozzles to be rotated into place. To this end, the upper support 14 mounts an upper magazine support post 18 and the lower support 16 mounts a lower magazine support post 20. The posts 18 and 20 are aligned but oriented at an acute angle to a longitudinal center axis A (FIG. 6) through the sprinkler head (extending through the adapter, nozzle bore and outlet bore in the lower support 16). In the exemplary but nonlimiting embodiment described herein, the lower support 16 is adapted, via threads 19, for operative connection to an otherwise conventional rotatable water deflector plate (not shown) that receives and distributes a stream emitted from the selected nozzle. It will be appreciated, however, that the nozzle magazine may be incorporated in other types of sprinklers where, for example, no deflector plate is utilized.

FIG. 1 also illustrates a substantially horizontally-oriented, flexible latch 22 that is adapted to engage notches in the nozzle magazine as described further below.

Figure 6:
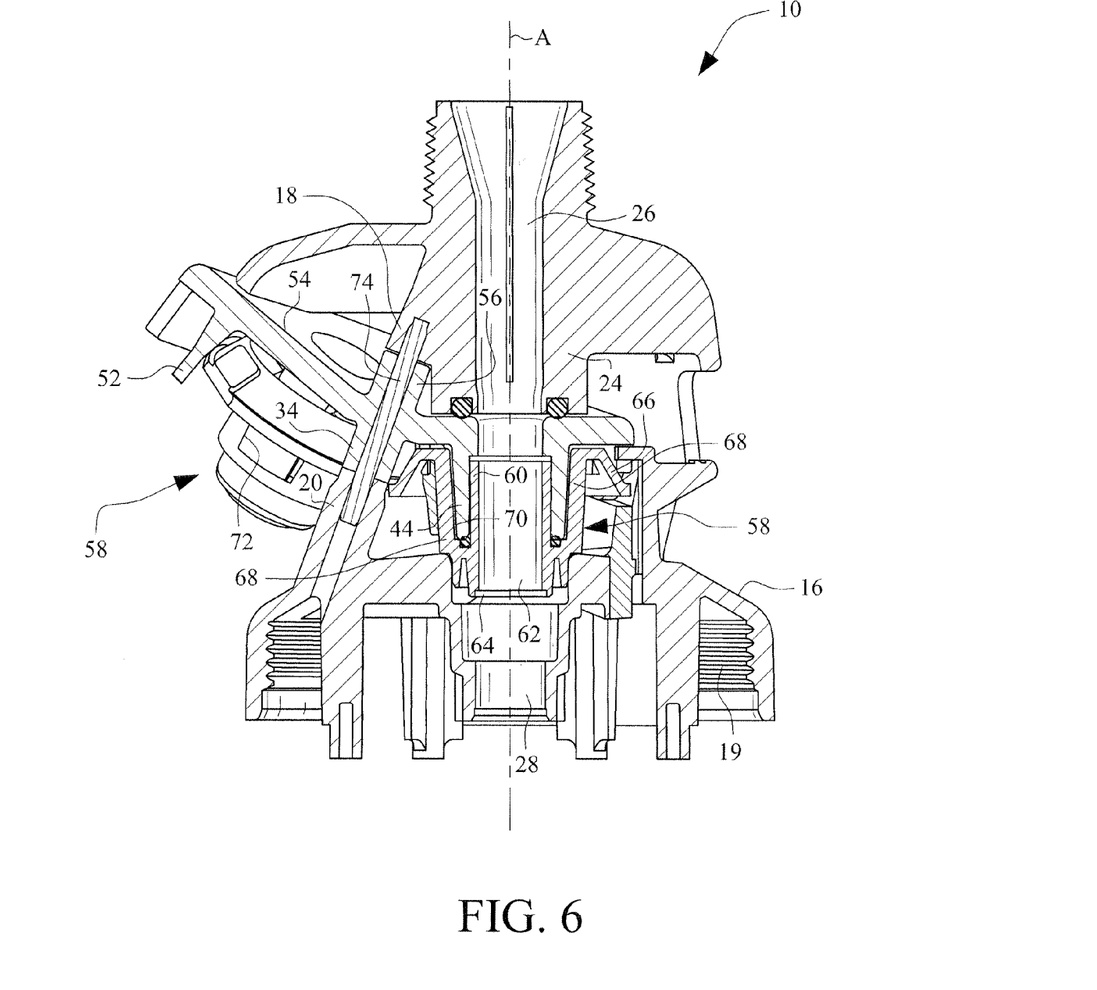
FIG. 6 is a cross section of the sprinkler head and nozzle magazine shown in FIG. 5.

The sprinkler head 10 also includes a center hub 24 defining an upper bore 26, best seen in FIG. 6. The lower support surface 16 is formed with a lower bore 28 that is aligned with the upper bore 26, noting that the nozzle (described below) will be inserted in alignment with both the upper and lower bores 26, 28.

Figure 2:
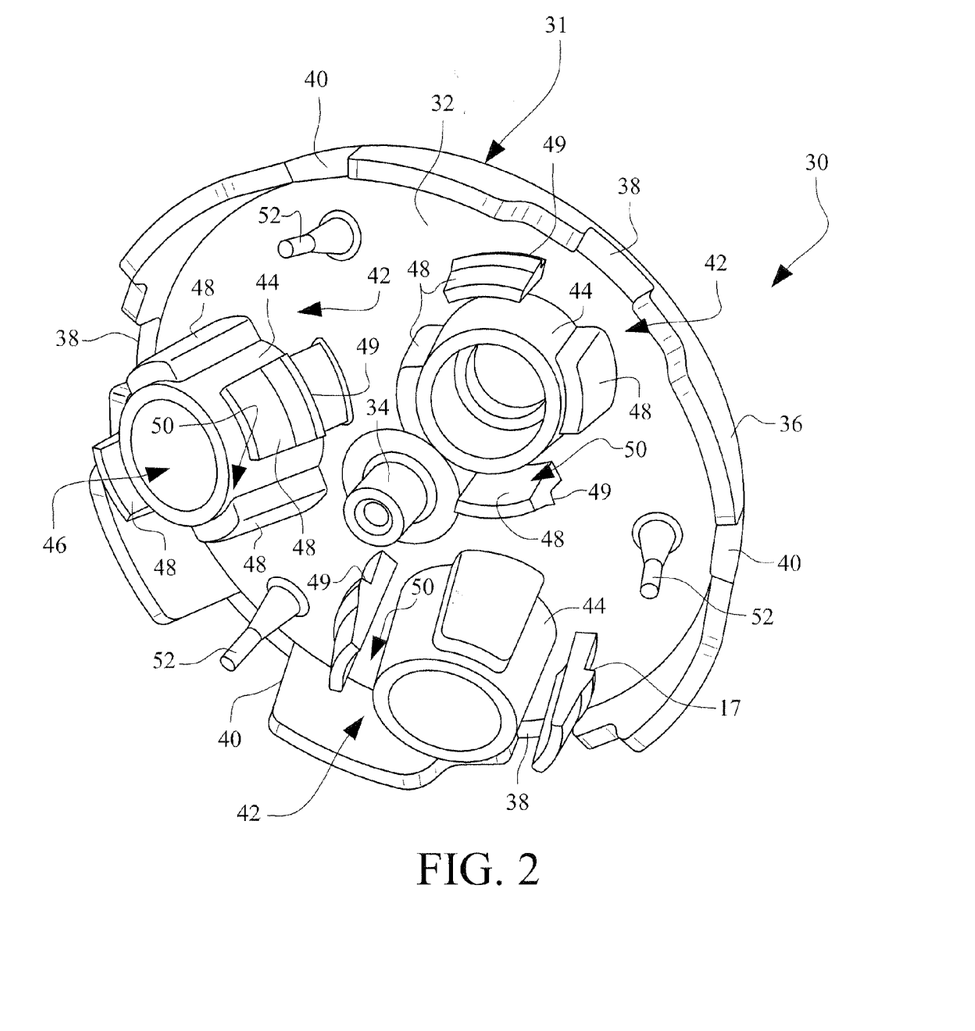
FIG. 2 is a perspective view of one side of a nozzle magazine for use with a sprinkler head of FIG. 1.

Turning now to FIG. 2, the nozzle magazine 30 is formed by a plate having a convex lower or under surface 32 and formed with a lower center post 34 that is adapted to align with the lower support post 20. A peripheral skirt 36 surrounds the convex lower surface 32 and is formed with a plurality (six in the example embodiment) of notches including three substantially-identical notches 38 alternating with three differently-configured notches 40. The notches 38 are located adjacent a plurality (3) of nozzle holders 42, each of which includes a central-cylindrical portion 44 defining a through opening 46, surrounded by outer, somewhat flexible, segments 48 that define an annular, radial gap 50 between the cylindrical portion 44 and the respective segments 48. In addition, adjacent the second group of notches 40 there is provided a grouping of three posts 52 located, alternately, between the nozzle holders 42.

Figure 3:
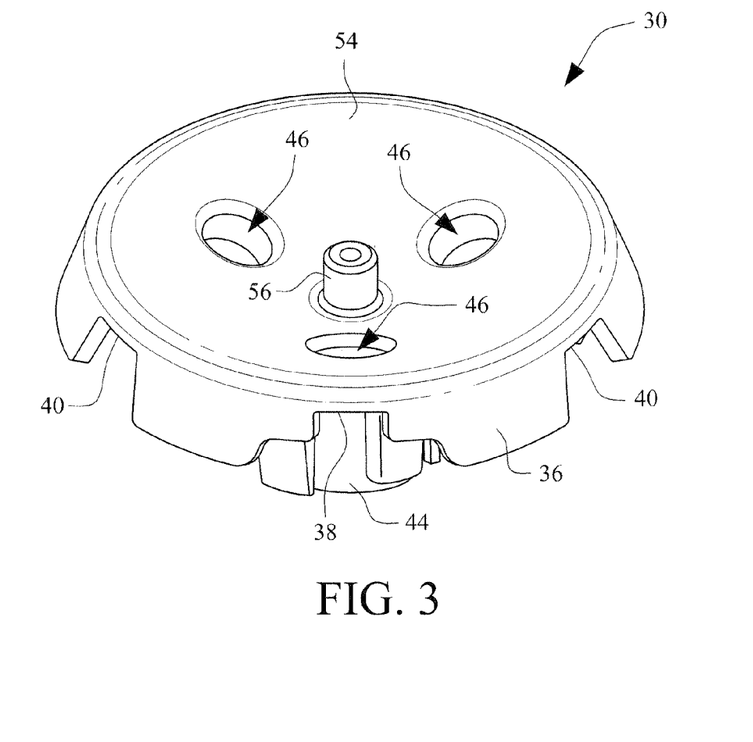
FIG. 3 is a perspective view of the opposite side of the nozzle magazine shown in FIG. 2.
Figure 4:
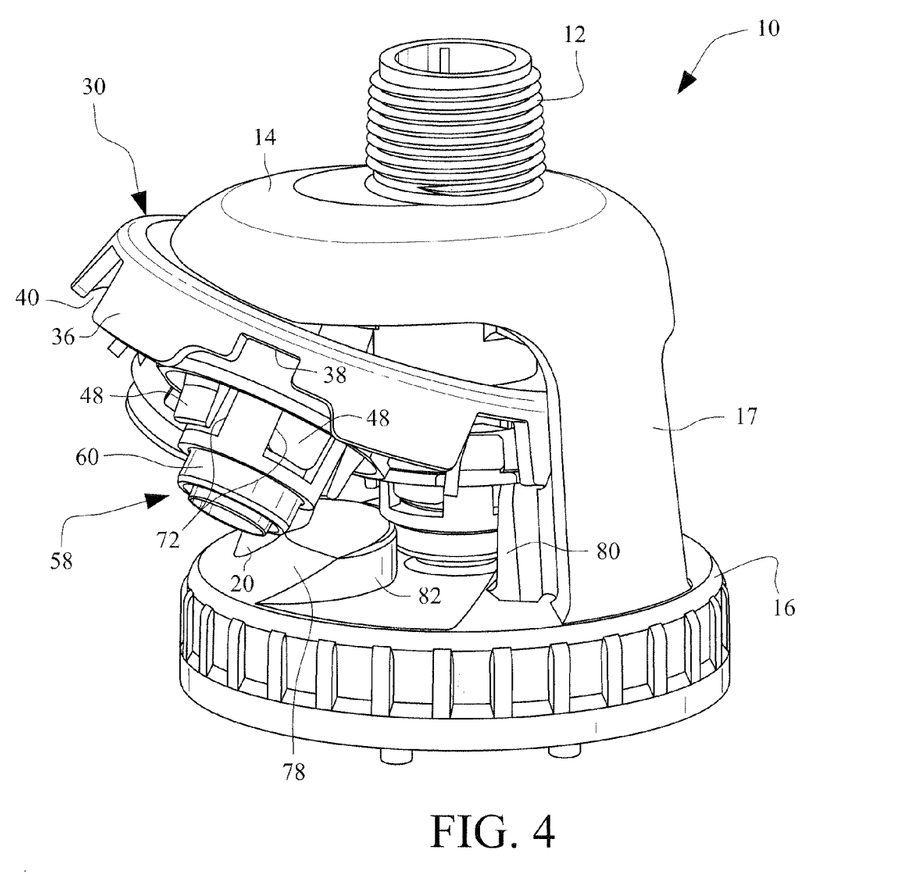
FIG. 4 is a perspective view of the sprinkler head of FIG. 1, with the nozzle magazine of FIGS. 2 and 3, supporting three different nozzles, installed within the sprinkler head.
Figure 5:
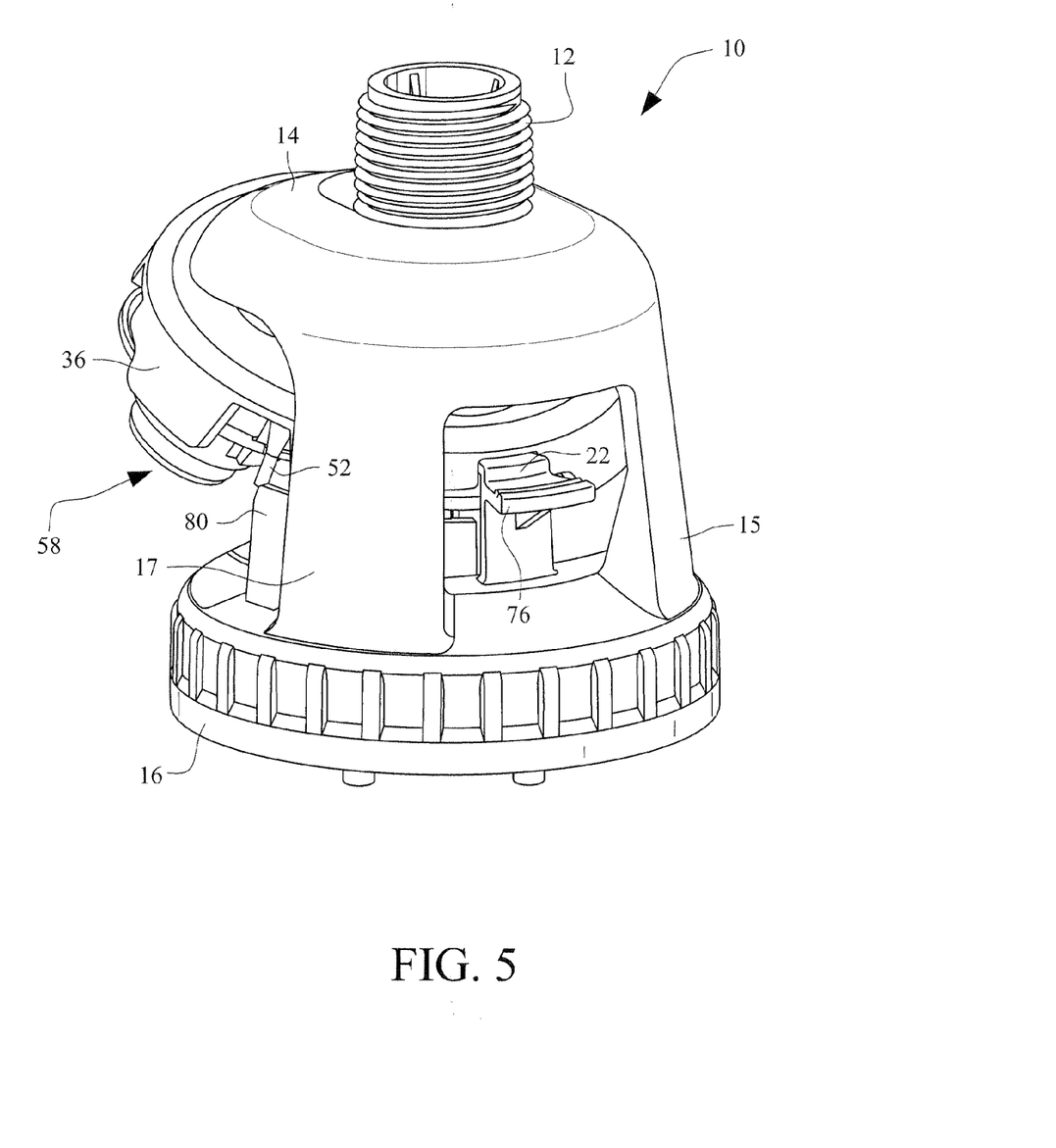
FIG. 5 is a perspective view similar to FIG. 4 but with the sprinkler head rotated about 45 degrees in a clockwise direction.

FIG. 3 shows the nozzle magazine 30 inverted relative to FIG. 2, including the concave top surface 54 and an upper center post 56 that is adapted to align with the upper magazine post 18 in the sprinkler body. Posts 34 and 56 may be integrated as one (see FIGS. 6-8) or they may be separate but co-axially aligned.

With particular reference to FIGS. 4-7, the three nozzles 58 that may be accommodated by the nozzle magazine 30 are substantially identical, particularly with respect to the manner in which the nozzles are supported on the magazine. The only difference is the diameter of the nozzle orifice 64 and, therefore, only one nozzle need be described in detail. As best seen in FIGS. 4 and 6-8, the nozzle 58 is formed with a center hub 60 defining a nozzle bore 62 and a nozzle orifice 64. An outer peripheral ring 66 (which may be used for identification purposes) is supported by means of webs or spokes 68 that establish an annular gap 70 between the spokes and the center hub. Circumferentially between the webs or spokes 68, there are a plurality of openings or windows 72 (FIG. 4), one of which can be seen clearly in the offset nozzle in FIGS. 4 and 6. Thus, the nozzles 58 are latched to the nozzle holders 42 on the nozzle magazine 30 via spring tabs 49 (FIG. 2) located on outside surfaces of at least two of the segments 48, while the cylindrical portion 44 of the nozzle holder receives the center hub 60 of the nozzle, with the spokes or webs 68 extending along the outer surface of the cylindrical portion 44, and with segments 48 received within the windows 72 of the nozzle. Nozzles of this type are described in greater detail in commonly-owned U.S. Pat. No. 5,415,348.

Figure 7:
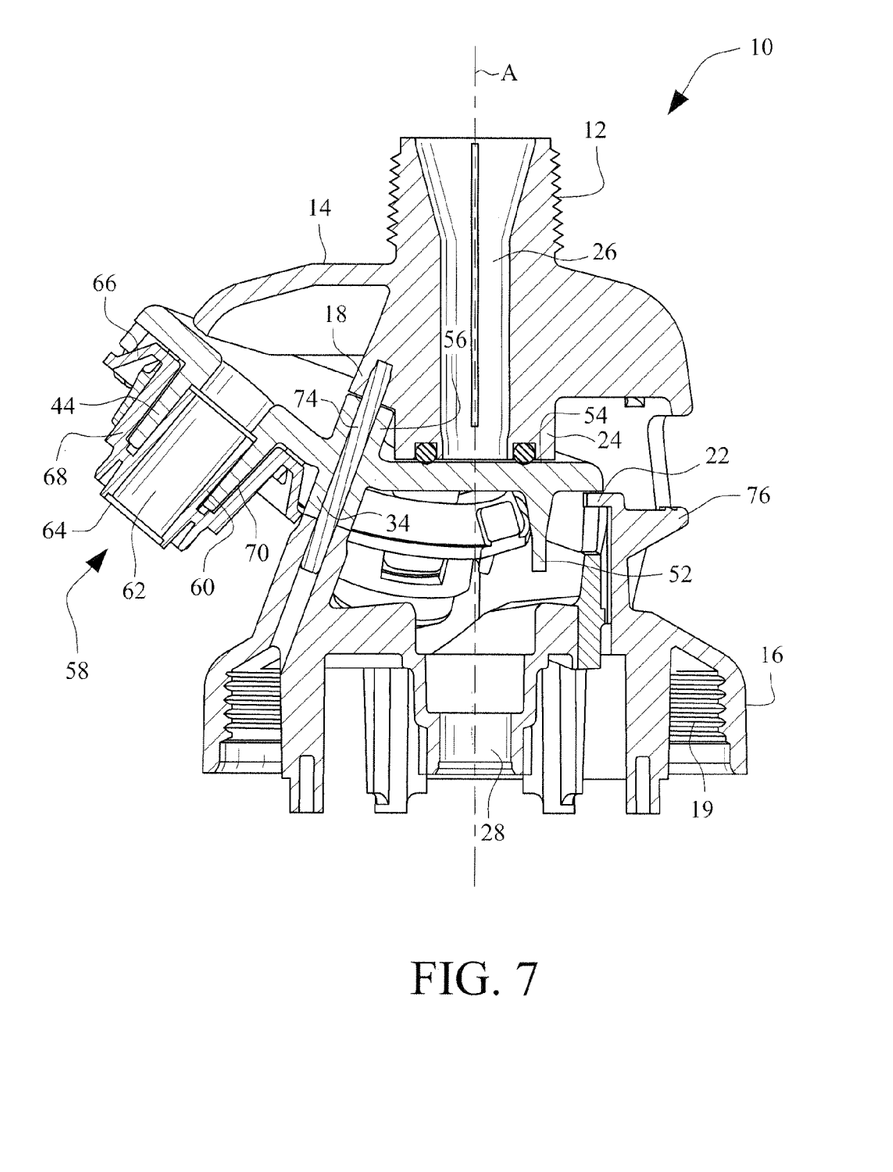
FIG. 7 is a cross section similar to FIG. 6, but with the nozzle magazine rotated counterclockwise about 60°.
Figure 8:
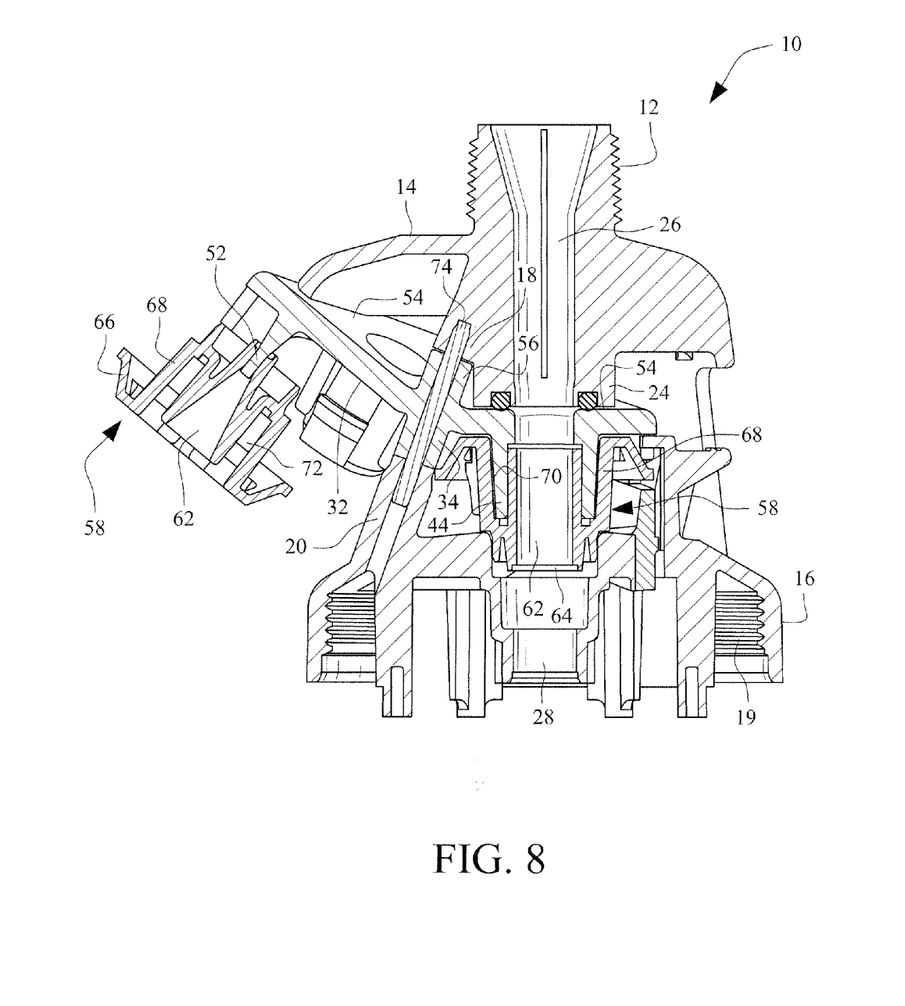
FIG. 8 is a cross section similar to FIG. 6 but with one of the nozzles supported on a cleaning post.

The nozzle magazine is attached to the sprinkler head with the aid of a pin or axle 74 (FIG. 7) received within the nozzle supporting posts 18 and 20, passing through the magazine and posts 34, 56 as shown in FIGS. 6-8. Considering the concave/convex nature of the magazine surfaces 32, 54, and the angled orientation of the rotation axis defined by axle 74, it will be appreciated that as the nozzle magazine rotates, the individual nozzles 58 are brought into alignment with the bores 26, 28 of the sprinkler head as best seen in FIG. 6. Further in this regard, rotation of the nozzle magazine is implemented by the user depressing the latch 22, and specifically the tab 76 (FIGS. 1 and 7) extending away from the latch 22, thus moving the latch out of engagement with one of the notches 38 or 40. The magazine 30 can then be rotated manually to bring the desired one of nozzles 58 into position where the nozzle bore 62 is aligned with the sprinkler head upper and lower bores 26, 28. Note that as the magazine 30 is rotated to move the presently-used nozzle out of its operative position, a portion of surface 54 closes off the supply of water at the adapter outlet, and as the new nozzle is rotated into alignment with the adapter outlet, the water supply resumes flow through the newly-placed nozzle. When the new nozzle is properly located, latch 22 can be released so as to engage the adjacent notch 38, thereby locking the nozzle magazine 30 in place, preventing circumferential movement or rotation of the magazine and nozzle relative to the sprinkler head. It is also contemplated that rotation of the nozzle magazine could be controlled remotely by a controller and suitable actuator on the sprinkler head.

Also note that the lower support 16 is formed on its upper surface with a raised boss 78 (FIGS. 1 and 4) from which the post 20 extends, and an arcuate wall portion 80 located on an opposite side of the bore 28. A curved surface 82 of the boss 78 and a curved surface 84 of the accurate wall portion 80 thus form an arcuate path for a nozzle 58 as the magazine 30 is rotated into position. Once properly aligned, the tab 76 is released so that the latch 22 will engage in a notch 38, locking the selected nozzle 58 in place.

In the event it is desired to simply shut the sprinkler head off, the magazine 30 may be moved into one of three intermediate positions, between the three nozzles and with the latch 22 engaged with a corresponding notch 40, such that surface portions of the concave surface 54 will shut off flow to the nozzle as best seen in FIG. 7. While the notches 38, 40 have different shapes, the interaction of either notch with the latch 22 is substantially identical. The shape of the upper portions of notches 38 is dictated by molding concerns rather than functionality vis-à-vis the nozzle magazine. With the sprinkler shut off, the user may, if needed, re-load the magazine with nozzles of different size or replace a broken or worn nozzle. This arrangement also allows the user to selectively shut off designated sprinklers to alter the sprinkling pattern to meet local soil/crop requirements.

FIG. 8 shows another feature of the invention wherein the posts 52 on the nozzle magazine may be used to clear debris from the nozzle orifice. Thus, the user may remove the nozzle from the magazine and push the nozzle orifice over the appropriately-sized post to clear the orifice.

It will be understood that the posts 52 may have different diameters to approximate differentially sized nozzle orifices.

It will be further understood that any reference herein to terms such as forward, rearward, top, bottom, left side or right side are for convenience only, and are based on the sprinkler head orientation in the various figures. The characterizations are not in any way to be considered limiting in the sense that the sprinkler head disclosed herein may be oriented in any desired manner in use.

While the invention has been described in connection with what is presently considered to be the most practical and preferred embodiment, it is to be understood that the invention is not to be limited to the disclosed embodiment, but on the contrary, is intended to cover various modifications and equivalent arrangements.

What is claimed is:

1. A sprinkler head with plural selectable nozzles comprising:
    a sprinkler body having inlet and outlet bores aligned along a first axis; and
    a nozzle magazine rotatably supported on said sprinkler body, said nozzle magazine carrying at least two nozzles and provided with at least one shut-off surface located between said at least two nozzles, said at least two nozzles and said at least one shut-off surface selectively rotatable into position between said inlet and outlet bores, said nozzle magazine rotatable about a second axis offset from and angled relative to said first axis, wherein said nozzle magazine is provided with a peripheral skirt with slots formed adjacent each of said at least two nozzles and said at least one shut-off surface portion; said sprinkler body formed with a resilient tab engageable within a selected one of said slots.

2. The sprinkler head of claim 1 wherein said nozzle magazine carries three nozzles and is provided with three shut-off surface portions.

3. The sprinkler head of claim 2 wherein any one of said three nozzles and said three shut-off surface portions are rotatable into position between said inlet and outlet bores.

4. The sprinkler head of claim 1 wherein said at least two nozzles each indicate a respective nozzle orifice size.

5. The sprinkler head of claim 1 wherein said resilient tab is manually releasable from said selected one of said slots to facilitate rotation of said nozzle magazine to another position.

6. The sprinkler head of claim 1 wherein said nozzle magazine is provided with at least one post adapted to clear debris from outlet orifices in said at least two nozzles.

7. A sprinkler head with plural selectable nozzles comprising:
a sprinkler body having inlet and outlet bores aligned along a first axis; and
a nozzle magazine rotatably supported on said sprinkler body, said nozzle magazine carrying at least two nozzles and provided with at least one shut-off surface located between said at least two nozzles, said at least two nozzles and said at least one shut-off surface selectively rotatable into position between said inlet and outlet bores, said nozzle magazine rotatable about a second axis offset from and angled relative to said first axis, wherein said nozzle magazine is supported between upper and lower vertically-spaced supports connected by at least one strut.

8. The sprinkler head of claim 7 wherein at least one strut comprises two struts.

9. The sprinkler head of claim 7 wherein said lower support is adapted for operative connection to a water deflection plate that receives and distributes a stream emitted from said nozzle.

10. A sprinkler head with plural selectable nozzles comprising:
a sprinkler body having inlet and outlet bores aligned along a first axis; and
a nozzle magazine rotatably supported on said sprinkler body, said nozzle magazine carrying at least two nozzles and provided with at least one shut-off surface located between said at least two nozzles, said at least two nozzles and said at least one shut-off surface selectively rotatable into position between said inlet and outlet bores, said nozzle magazine rotatable about a second axis offset from and angled relative to said first axis, wherein said nozzle magazine is formed on one side with a nozzle holder for each of said at least two nozzles, each nozzle holder comprised of an open-ended cylindrical projection with plural resilient, upstanding tabs surrounding but radially spaced from said open-ended cylindrical projections, wherein, in use, a nozzle is telescopically received over said cylindrical projection and held by said plural, resilient upstanding tabs.

11. The sprinkler head of claim 10 wherein said at least one shut-off surface portion is on a side of said nozzle magazine opposite said nozzle holder.

12. A sprinkler body adapted for connection between a water supply conduit and a rotatable deflector plate, the sprinkler body comprising:
vertically-spaced upper and lower supports connected by at least one strut, the upper support including an adapter for connection to the water supply conduit, the lower support formed with a coupling portion for attachment to the rotatable deflector plate; said upper and lower supports formed with aligned first and second bores lying on a longitudinal center axis of the sprinkler body; and
a rotatable nozzle magazine mounted between said upper and lower supports and carrying at least two nozzles for selective rotation about an axis oriented at an acute angle to said longitudinal center axis into an operative position where one of the at least two nozzles is aligned with said first and second bores, and wherein at least one shut-off surface portion is located on said magazine between said at least two nozzles.

13. The sprinkler head of claim 12 wherein said nozzle magazine carries three nozzles and is provided with three shut-off surface portions.

14. The sprinkler head of claim 12 wherein said at least two nozzles each have identification surfaces indicating respective nozzle orifice sizes.

15. The sprinkler head of claim 12 wherein said nozzle magazine is provided with a peripheral skirt with slots formed adjacent each of said at least two nozzles and said at least one shut-off surface portion; said sprinkler body formed with a resilient tab engageable within a selected one of said slots when said nozzle magazine is rotated to one of said operative positions.

16. The sprinkler head of claim 15 wherein said resilient tab is manually releasable from said selected one of said slots to facilitate rotation of said nozzle magazine to another operative position.

17. A sprinkler head with plural selectable nozzles comprising:
a sprinkler body having inlet and outlet bores aligned along a first axis; and
a nozzle magazine rotatably supported on said sprinkler body, said nozzle magazine provided with three nozzle holders adapted to carry three nozzles and at least two shut-off surface portions located between said three nozzle holders, said nozzle magazine selectively rotatable into any of at least five operative positions between said inlet and outlet bores, said nozzle magazine rotatable about a second axis angularly offset from said first axis; and wherein said nozzle magazine is provided with an annular peripheral skirt with slots formed adjacent each of said three nozzles and said at least two shut-off surface portions; said sprinkler body formed with a resilient tab engageable within a selected one of said slots.

18. The sprinkler head of claim 17 wherein said at least two shut-off surface portions is on a side of said nozzle magazine opposite said three nozzle holders.

19. The sprinkler head of claim 17 wherein said nozzle carrier is provided with at least one post adapted to clear debris from respective outlet orifices in the three nozzles.

* * * * *